(12) United States Patent
Leng

(10) Patent No.: US 6,849,815 B2
(45) Date of Patent: Feb. 1, 2005

(54) STEERING COLUMN SWITCH FOR MOTOR VEHICLES

(75) Inventor: Peter Leng, Oberursel (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/480,345

(22) PCT Filed: Jun. 1, 2002

(86) PCT No.: PCT/DE02/02022

§ 371 (c)(1),
(2), (4) Date: Dec. 9, 2003

(87) PCT Pub. No.: WO02/100681

PCT Pub. Date: Dec. 19, 2002

(65) Prior Publication Data

US 2004/0173444 A1 Sep. 9, 2004

(30) Foreign Application Priority Data

Jun. 9, 2001 (DE) .......................... 101 28 069
Aug. 24, 2001 (DE) .......................... 101 41 578

(51) Int. Cl.⁷ ................................ H01H 9/00
(52) U.S. Cl. ................................ 200/61.54
(58) Field of Search ................ 200/61.27, 61.3, 200/61.31, 61.54, 17 R, 332, 335

(56) References Cited

U.S. PATENT DOCUMENTS

| 5,294,759 | A | * | 3/1994 | Krehnovi | 200/61.27 |
|---|---|---|---|---|---|
| 5,701,660 | A | * | 12/1997 | Javery et al. | 29/622 |
| 5,859,396 | A | * | 1/1999 | Yokoyama | 200/61.54 |
| 5,967,300 | A | * | 10/1999 | Hecht et al. | 200/512 |
| 6,020,563 | A | | 2/2000 | Risk, Jr. et al. | |
| 6,091,033 | A | * | 7/2000 | Kato | 200/61.54 |
| 6,150,620 | A | * | 11/2000 | Luley et al. | 200/61.27 |
| 6,756,550 | B2 | * | 6/2004 | Ficek et al. | 200/61.54 |

FOREIGN PATENT DOCUMENTS

| DE | 19819088 | 11/1999 |
|---|---|---|
| DE | 19912087 | 9/2000 |
| DE | 19920547 | 2/2001 |
| EP | 919436 | 6/1999 |

* cited by examiner

*Primary Examiner*—Michael A. Friedhofer
(74) *Attorney, Agent, or Firm*—David P. Wood

(57) ABSTRACT

A steering switch for vehicles, especially a switch for front and back windscreen wiping/washing switches, including two rotating switches arranged as a distance from each other and integrated into a switch lever, said rotating switches including contact bridges provided with a plurality of contact arms which are respectively secured onto a rotating switch element, and impinge upon the switch contact bridges with associated connecting contacts which are connected to the contacts on the edge of the network.

12 Claims, 1 Drawing Sheet

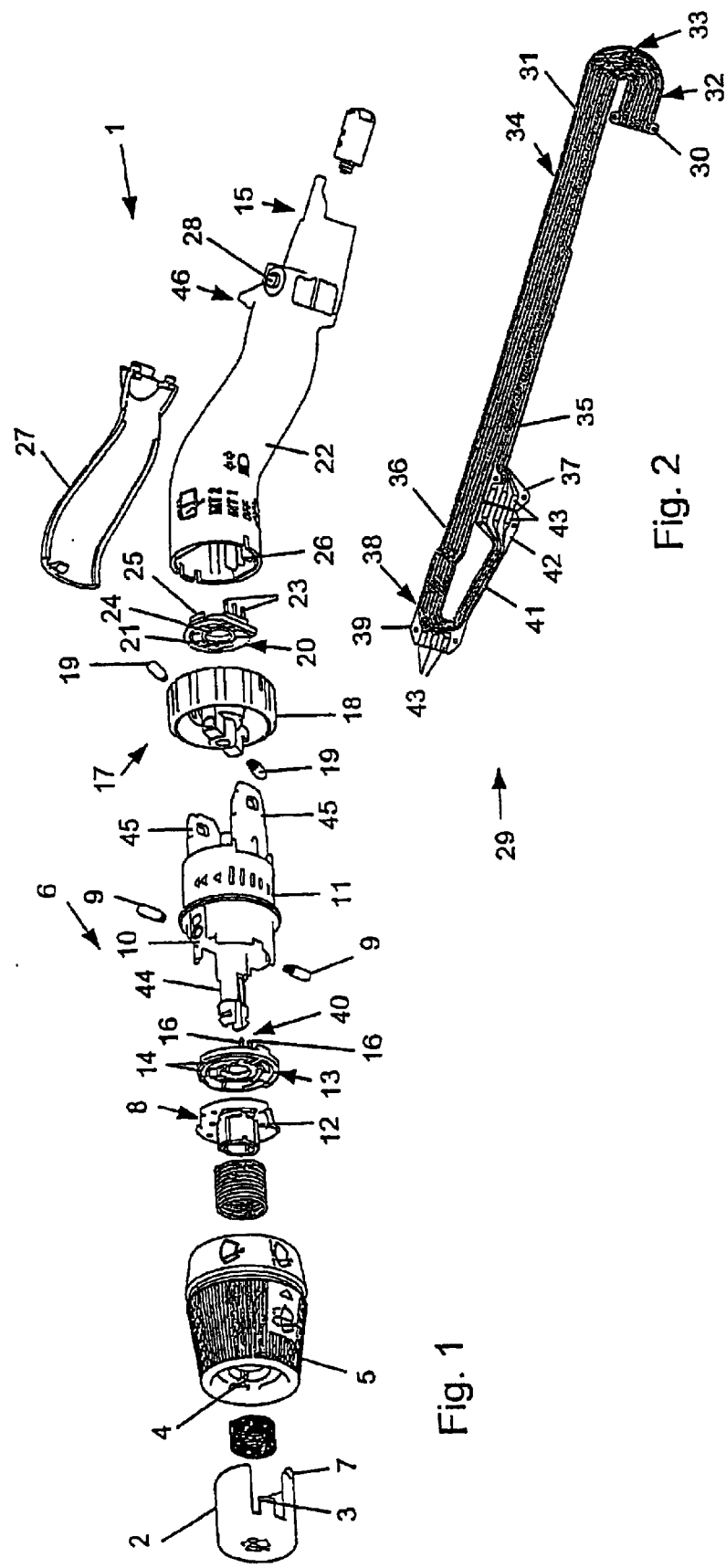

STEERING COLUMN SWITCH FOR MOTOR VEHICLES

TECHNICAL FIELD

The invention generally relates to electrical switches and more particularly relates to a steering column switch for motor vehicles.

BACKGROUND OF THE INVENTION

DE 199 12 087 A1 discloses a steering column switch, which includes a rotary switch for the front wiper functions arranged rotationally symmetrically on a longitudinal axis of a switch lever of the steering column switch. A push-button switch for a front washer function is arranged at the free end of the switch lever. In addition, another rotary switch for the rear wiper/washer functions is arranged on the rotary switch for the front wiper functions. Both the front wiper functions and the rotary switch for the rear wiper/washer functions have a number of contact bridges that corresponds to the number of switch positions, wherein these contact bridges act on corresponding switch contact tracks. The contact bridges and the associated switch contact tracks are shaped like circular segments at the periphery of a rotary switch element of each rotary switch at one end of the rotary switch element. To activate the front washer function, the associated push-button switch is pushed in, wherein the push button also acts on. associated switch contact tracks by way of a corresponding activation plunger that interacts with a contact bridge. The connection of the switch contact tracks to contacts of the vehicle power supply is performed by means of connection lines, which are attached to connection contacts and which are led through the longitudinal axis of the steering column switch. Here, the number of connection lines corresponds to the number of switch contact tracks. For a predetermined number of switch positions, the outer diameter of the switch lever is essentially dependent on the space requirements of the connection lines, particularly in the region of cable bushings between the first and the second rotary switch, wherein the connection lines must feature a certain cross section and insulation.

Furthermore, a flexible circuit board is known from DE 198 19 088 A1, which includes a carrier film for conductive tracks and is used as a cable tree for electrical contact of a certain arrangement of electrical and/or electronic components. Such flexible circuit boards are increasingly used as replacements for conventional cable trees consisting of round conductors. The individual conductive tracks are electrically insulated from each other and typically have a rectangular cross section. The top sides of the conductive tracks are electrically insulated by means of a coating or a film.

The solved problem of the invention is creating a steering column switch of the initially mentioned type, whose rotary switches are connected to the vehicle power supply with minimal space requirements.

According to the invention, the problem is solved such that the connection contacts are connected to the contacts of the vehicle power supply by means of a flexible circuit board, the circuit board has one branch from the connection to the vehicle power supply, wherein this branch divides into two branches, each with a connection, wherein of these two branches, one transitions into another branch with a connection, and the connection of the second branch is associated with one rotary switch and the connections of the third and fourth branches are associated with the other rotary switch.

Due to these measures, the space requirements for the electrical connection of the two rotary switches to the vehicle power supply are relatively small, since, on the one hand, the flexible circuit board has a thin structure and, on the other hand, the circuit board is divided into several branches for coupling the rotary switch to the vehicle power supply. Furthermore, the flexibility of the circuit board guarantees high functional reliability of the steering column switch. The circuit board deforms in accordance with the movements of the switch lever as well as the movements caused by the individual rotary switches. In addition, the flexible circuit board is relatively easy to mount by means of simple threads through individual components of the switch lever. The individual branches of the circuit board are manufactured through stamped cut-outs of the circuit board film.

The first branch of the circuit board in the flat plane starting from the connection to the vehicle power supply features a first rectilinear region, which transitions by way of an angled section into a second rectilinear region, which is aligned parallel and spatially separated from the first region. The region of the angled section is arranged in the outlet region of the flexible circuit board from the switch lever and, according to corresponding deformation, enables the connection of the connector to the contacts of the vehicle power supply and provides the flexibility required for the pivoting motion of the switch lever.

Advantageously, the second rectilinear region of the first branch splits in a plane above the connection to the vehicle power supply into the second and third branches, which are aligned parallel to each other, wherein the second branch carries the connection at the end and the third branch extends in a straight line outwards over a plane of the connection. Furthermore, the third branch transitions into an angled section running in the direction of the connection of the second branch, in which the connection is arranged. Finally, the third branch transitions in the region of its angled section into the fourth branch, which carries the connection on the end. The course of the individual branches of the circuit board corresponds to a cable tree-like structure and can be realized for the production of the circuit board with minimal material consumption.

In order to be able to implement the connection of the connectors to the associated connection contacts of the switch contact tracks or the contacts of the vehicle power supply relatively easily, the connection for the vehicle power supply, the connection of the second branch, and the connection of the third branch point in the same direction, and the connection of the fourth branch points in the opposite direction.

According to an advantageous refinement of the invention, the connection contacts of the first rotary switch, which is allocated to the free end of the switch lever, are divided into two groups arranged diametrically opposite each other and spatially separated, wherein the first group is connected to the connection of the third branch and the second group is connected to the connection of the fourth branch of the circuit board. Because the connection contacts are provided in two groups, the space requirements for the plurality of connection contacts is extremely small and simultaneously, the functionality of the first rotary switch is guaranteed.

So that the connection between the connection contacts and the contacts of the vehicle power supply by means of the flexible circuit board do not have a disruptive effect on the mechanics of the first rotary switch, the fourth branch of the circuit board in the assembled state of the first rotary switch preferably passes to the side of the hinge pin formed on an intermediate ring.

In a further configuration of the invention, the fourth branch of the circuit board is deformed essentially in the form of a W due to a crosspiece of the intermediate ring supported to the side of the locking sleeves. This deformation is realized automatically during assembly and must be taken into account only for the length dimensioning of the fourth branch.

In order to create a long-lasting electrical connection between the connections and the associated contacts, the connections have contact points that are soldered to the associated connection contacts or to the contacts of the vehicle power supply.

The rotary switch element of the first rotary switch preferably features a contact arm to be activated by a push button inserted in the first rotary switch for acting on associated switch contact tracks. Thus, another switch is integrated in the steering column switch. The electrical connection of this switch to the contacts of the vehicle power supply is realized by means of the flexible circuit board without additional space requirements.

Advantageously, the switch contact tracks of the first and second rotary switch are structured as an extrusion-coated stamped grid, wherein the switch contact tracks of the first rotary switch are arranged on the hinge pin of the intermediate ring and the switch contact tracks of the second rotary switch are arranged on an axial end of an activation element of the rotary switch. The extrusion-coated stamped grids can be handled easily during the soldering of the connections of the circuit board and during the assembly in the switch lever.

It is understood that the features mentioned above and the features still to be explained in the following can be used not only in the indicated combination, but also in other combinations without leaving the scope of the present invention.

BRIEF DESCRIPTION OF THE INVENTION

FIG. 1, an exploded view of a switch lever of a steering column switch according to the invention, and FIG. 2, a flexible circuit board of the steering column switch in a flat plane.

DETAILED DESCRIPTION OF THE PREFERRED EMBODIMENTS

A spring-loaded push button 2 for a front washer function is inserted in a switch lever 1 of the steering column switch at the end. This push button is inserted by means of two opposing clip arms 3 so that it can move in corresponding grooves 4 of an activation element 5 of a first rotary switch 6 configured as a front wiper/washer switch. On the side associated with the activation element 5 on the outer periphery of the push button 2, there is an activation plunger 7, which projects through a rotary switch element 8 of the first rotary switch 6.

The first rotary switch 6 essentially includes the rotating activation element 5, in which the rotary switch element 8 is supported locked in rotation. On the peripheral side in the activation element 5, a lock (not shown) is configured, which interacts with spring-loaded locking sleeves 9, wherein the locking sleeves 9 are arranged in a crosspiece 10 of an intermediate ring 11 of the switch lever 1. The interaction of the lock with the locking sleeves 9 creates a secure fixing of the first rotary switch 6 in the desired switch position. The rotary switch element 8 has a contact bridge for the front wiper/washer functions on its end side facing the intermediate ring 11, wherein only one spring-loaded contact 12 to be activated by the activation plunger 7 of the push button 2 can be seen for the front washer function. The free ends of the contact arms (not shown) point in the direction of the intermediate ring 11 and the free end of the contact arm 12 points in the direction of the activation plunger 7 of the push button 2. The free ends of the contact arms are arranged such that they interact with switch contact tracks 14 configured as a stamped grid 13 for transmitting the front wiper functions. In order to achieve sufficient stability of the stamped grid 13, the grid is extrusion coated and supported locked in rotation on a hinge pin 14 of the intermediate ring 11. For connecting the stamped grid 13 to contacts (not shown) of a vehicle power supply, each of the switch contact tracks 14 is provided with a connection contact 15 pointing in the direction of a foot 15 of the switch lever 16.

On the side of the intermediate ring 11 facing away from the stamped grid 13, a second rotary switch 17 configured as a rear wiper/washer switch is located with a rotary switch element (not shown), which is arranged in an activation element 18 supported on an axial end of the intermediate ring 11. On the peripheral side, the activation element 18 supports two locking sleeves 19, which interact with a lock of the intermediate ring 11. The switch contact tracks 21 of the second rotary switch 17 configured as an extrusion-coated stamped grid 20. are supported locked in rotation in a housing 22 of the switch lever 1 and have connection contacts 23, which extend into the housing 22. A position centering of the stamped grid 20 is realized, on the one hand, by means of a shaft of the activation element 18, where this shaft extends through a corresponding hole 24 of the stamped grid 20, and on the other hand, by means of tabs 25, which are formed on the stamped grid 20 and which engage in corresponding housing-side grooves 26.

For attaching the first rotary switch 6 and the second rotary switch 17 to the housing 22 of the switch lever 1, where this housing has a cover 27, the intermediate ring 11 has clip arms 45 which project through corresponding cut-outs of the activation element 18 of the second rotary switch 17 and interact with locking tabs of the housing 22.

Furthermore, at the foot 15 of the switch lever 1, carrier axial ends 28 for pivoting support of the switch lever 1 are provided in a steering column switch housing (not shown).

For connecting the connection contacts 16 of the switch contact tracks 14 associated with the first rotary switch 6 and the connection contacts 23 of the switch contact tracks 21 associated with the second rotary switch 17 to the contacts of the vehicle power supply, a flexible circuit board 29 is provided, which is illustrated in FIG. 2 in a flat plane. Starting from a connection 30 for the contacts of the vehicle power supply, a first branch 31 of the circuit board 29 has a first rectilinear region 32, which transitions via an angled section 33 into a second rectilinear region 34. The first rectilinear region 32 and the second rectilinear region 34 of the first branch 31 are aligned parallel and spatially separated from each other. In a plane above the connection 30, the second rectilinear region 34 of the first branch 31 splits into a second branch 35 and a third branch 36, which are aligned parallel to each other. The second branch 35 carries at its end a connection 37 for connecting to the connection contacts 23 of the switch contact tracks 21 associated with the second rotary switch 17. The third branch 36 extends outwardly in a straight line over a plane of the connection 37 of the second branch 35 and transitions into an angled section 38 running in the direction of the connection 37 of the second branch 35. In the angled section 38, there is a connection 39 for a first group 40 of connection contacts 16 of the switch contact tracks 14 associated with the first rotary switch 6. Furthermore, the third branch 36 transitions in its angled section 38 into a fourth branch 41, which carries at its end a connection 42 for a second group of connection contacts 16 of the switch contact tracks 14 associated with the first rotary switch 6. The connection 30 for the vehicle power supply, the connection 37 of the second branch 35, and the connection 39 of the third branch 36 point in the same direction, and the connection 42 of the fourth branch 41 points in the opposite direction. Each of the connections 30, 37, 39, 42 have contact points 43, which are each soldered to the associated connection contacts 16, 23 or to the contacts of the vehicle power supply.

For the assembly of the switch lever 1, the third branch 36 and the fourth branch 42 are guided both through cut-outs of the activation element 18 of the second rotary switch 17 and through cut-outs of the intermediate ring 11, and the contact points 43 of the connections 39, 42 are soldered to the associated connection contacts 16 of the switch contact tracks 14 associated with the first rotary switch 6. For the assembly of the first rotary switch 6, the stamped grid 13 is set on a hinge pin 44 of the intermediate ring 11 and held by clips of the activation element 5 on the hinge pin 44. In this way, the fourth branch 41 grips the crosspiece 10 of the intermediate ring 11 such that it deforms into the form of a W. The push button 2 is clipped into the free end of the activation element 5. Furthermore, the contact points of the connection 37 of the second branch 35 are soldered to the connection contacts 23 of the switch contact tracks 21 associated with the second rotary switch 17, and the stamped grid 20 is set on the axial end of the activation element 18. Thus, the first 31, the second 35, and the third branch 36 are led through the housing 22 of the switch lever 1 and the housing 22 is closed with the cover 27. Then the intermediate ring 11 is fixed in the housing 22 by means of its clip arms 45 and the activation element 18 of the second rotary switch 17 is supported between the intermediate ring 11 and the housing 22. The first branch 31 of the circuit board 29 is led out of the switch lever in the region of the foot 15 of the switch lever 1 from an opening 46 formed between the cover 27 and the housing 22 and connected to the contracts of the vehicle power supply.

List of Reference Numbers

1 Switch lever
2 Push button
3 Clip arm
4 Grooves
5 Activation element
6 First rotary switch
7 Activation plunger
8 Rotary switch element
9 Locking sleeve
10 Crosspiece
11 Intermediate ring
12 Contact arm
13 Stamped grid
14 Switch contact track
15 Foot
16 Connection contact
17 Second rotary switch
18 Activation element
19 Locking sleeve
20 Stamped grid
21 Switch contact track
22 Housing
23 Connection contact
24 Hole
25 Tab
26 Groove
27 Cover
28 Carrier axial end
29 Circuit board
30 Connection
31 First branch
32 First rectilinear region
33 Angled section
34 Second rectilinear region
35 Second branch
36 Third branch
37 Connection of 35
38 Angled section of 36
39 Connection of 36
40 Group
41 Fourth branch
42 Connection of 41
43 Contact position
44 Hinge pin
45 Clip arm
46 Opening

What is claimed is:

1. Steering column switch for motor vehicles, COMPRISING:

first and second rotary switches integrated into a common switch lever, wherein said first and second rotary switches include respectively associated contact bridges which are each fixed to a rotary switch element, wherein the rotary switch element includes several contact arms that act on switch contact tracks having respectively associated connection contacts, which are connected to contacts of a vehicle power supply, wherein the connection contacts are connected to the contacts of the vehicle power supply by means of a flexible circuit board, wherein the circuit board includes a power supply connection and a first branch, which splits into second and third branches, wherein each of said second and third branches includes a respectively associated connection, wherein one of the second and third branches transitions into a fourth branch having a connection, and wherein the connection of the second branch is associated with said first rotary switch and wherein the connections of the third and fourth branches are associated with the second rotary switch.

2. Steering column switch according to claim 1, wherein the first branch of the circuit board has a first rectilinear region in a flat plane starting from the power supply, wherein the rectilinear region transitions by way of an angled section into a second rectilinear region, which is aligned parallel and spatially separated from the first rectilinear region.

3. Steering column switch according to claim 2, wherein the second rectilinear region of the first branch splits into the second and the third branch in a plane above the power supply connection, wherein the second and third branches are aligned parallel to each other, wherein the second branch carries its respectively associated connection on its end and the third branch extends outwards in a straight line over a plane of the connection associated with the second branch.

4. Steering column switch according to claim 1, wherein the third branch transitions into an angled section extending in the direction of the connection respectively associated with the second branch.

5. Steering column switch according to claim 4, wherein the third branch transitions, in the region of its angled section, into the fourth branch, wherein the fourth branch includes a respectively associated end connection.

6. Steering column switch according to claim 5, wherein the power supply connection, the connection of the second branch, and the connection of the third branch all point in the same direction and wherein the connection of the fourth branch points in the opposite direction.

7. Steering column switch according to claim 1, wherein several connection contacts are associated with the first rotary switch, wherein these connection contacts are divided into first and second groups and arranged diametrically opposite each other and spatially separated, wherein the first group is connected to the connection of the third branch and the second group is connected to the connection of the fourth branch.

8. Steering column switch according to claim 7, wherein the fourth branch is deformed essentially into the shape of a "W".

9. Steering column switch according to claim 7, wherein the connections associated with the second, third, and fourth groups have respectively associated contact points, which are each soldered to at least one connection contact or to the contacts of the vehicle power supply.

10. Steering column switch according to claim 1, wherein the fourth branch of the circuit board runs past to the side of a hinge pin formed on an intermediate ring of the first rotary switch.

11. Steering column switch according to claim 1, wherein at least one rotary switch element includes a contact arm to be activated by a push button inserted in the first rotary switch.

12. Steering column switch according to claim 1, wherein the switch contact tracks are configured as extrusion coated stamped grids, wherein at least one of the switch contact tracks are arranged on a hinge pin of an intermediate ring and wherein at least one of the switch contact tracks are arranged on an axial end of an activation element.

* * * * *

UNITED STATES PATENT AND TRADEMARK OFFICE
CERTIFICATE OF CORRECTION

PATENT NO. : 6,849,815 B2  Page 1 of 1
DATED : February 1, 2005
INVENTOR(S) : Peter Leng It is certified that error appears in the above-identified patent and that said Letters Patent is hereby corrected as shown below:

Title page,
Item [57], ABSTRACT,
Line 1, insert -- column -- before "switch"

Signed and Sealed this

Third Day of May, 2005

JON W. DUDAS
*Director of the United States Patent and Trademark Office*